United States Patent Office 2,911,393
Patented Nov. 3, 1959

2,911,393

CHLOROPRENE POLYMERS CONTAINING ASYMMETRIC DI-SUBSTITUTED THIOUREA ACCELERATORS

Lester A. Brooks, East Norwalk, and Jack C. Bacon, Noroton Heights, Conn., assignors to R. T. Vanderbilt Company, Inc., New York, N.Y., a corporation of New York No Drawing. Application June 15, 1956
Serial No. 591,516

24 Claims. (Cl. 260—79.5)

The present invention relates to the vulcanization of chloroprene polymers containing novel accelerators and especially to the vulcanization of the chloroprene polymer known as neoprene type W.

Chloroprene polymers or neoprene are polymers of 2-chloro-1,3-butadiene (chloroprene) and copolymers of chloroprene with dienes or vinyl compounds in which chloroprene comprises the predominant monomer. These polymers or copolymers are usually made in aqueous emulsions and are available to the rubber trade under such names as GR–M, neoprene type GN, neoprene type GNA, neoprene type FR, neoprene type E, neoprene type K, neoprene type KNR, neoprene type W, and neoprene type WRT. The various types of polychloroprene or neoprene differ one from the other in the modifier used in controlling the degree of polymerization of chloroprene, typical modifiers being sulfur, sulfur dioxide, hydrogen sulfide, mercaptans, iodine compounds, and aromatic azo compounds. The chloroprene polymer which is currently finding wide commercial acceptance because of its uniformity in molecular weight distribution and useful properties is neoprene type W, a stabilized chloroprene polymer containing no sulfur, thiuram disulfide, or other compound capable of decomposing to liberate free sulfur or form vulcanization accelerators.

Polychloroprenes differ greatly from other synthetic rubbers and from natural rubber in the manner in which they can be vulcanized. In general, excellent vulcanizates may be obtained from polychloroprenes by incorporating certain metallic oxides, such as zinc oxide and magnesia, into the plastic polychloroprene and heating to effect vulcanization. For certain applications litharge is recommended for use in place of the zinc oxide and magnesia, while for some types sulfur is recommended but is not necessary to effect vulcanization.

When a more rapid rate of cure is desired than can be obtained by the use of these metallic oxides alone, it has been the custom of the rubber trade to employ certain organic compounds as accelerators in conjunction with these metallic oxides. Thiocarbanilide or N,N'-diphenylthiourea is an example of an accelerator which has been used heretofore in the vulcanization of natural rubber, while catechol and hexamethylenetetramine are examples of previously used accelerators in the vulcanization of polychloroprene. The accelerator which has proved most effective in the vulcanization of polychloroprene, however, is ethylenethiourea. The heretofore known accelerators, including those mentioned above, do not impart to the vulcanizate the desired physical properties, such as hardness, and in some instances are too scorchy, i.e., they are so active at relatively low temperatures that the polychloroprene is liable to cure prematurely or "scorch" during processing and accordingly cause economic losses.

Accordingly, it is the object of the present invention to provide accelerators for the vulcanization of chloroprene polymers and especially for the vulcanization of the chloroprene polymer known as neoprene type W which will impart to the vulcanizates physical properties which are comparable to or better than those imparted by the previously known accelerators and which are less scorchy than ethylenethiourea, the best accelerator developed heretofore.

The accelerators of the present invention having these desirable properties are thiourea accelerators represented by the general formula

where $R_1$ is a monocyclic aryl radical, i.e., a phenyl radical or a substituted phenyl radical, and $R_2$ is a saturated aliphatic radical having from one to eight carbon atoms or an alicyclic radical having from three to six carbon atoms. Examples of substituents which may be on the phenyl radical either in the ortho, meta, or para positions include alkoxy radicals, such as methoxy; halogen radicals, such as chloro; hydroxy; amino; nitro; alkyl; arylalkyl; and alkylaryl. The saturated aliphatic radical may accordingly be straight or branched chain and the saturated aliphatic and cycloaliphatic radicals may accordingly be substituted or unsubstituted. A typical straight chain saturated aliphatic radical is ethyl while an example of a branched chain saturated aliphatic radical is tertiary butyl. Examples of substituted saturated aliphatic radicals include aryl substituted radicals, e.g., alpha-phenylethyl; hydroxy substituted radicals, e.g., beta-hydroxyethyl; alkyl substituted radicals, e.g., alpha-methylpropyl, and beta-methylpropyl; halogen substituted radicals, e.g., chloroethyl; alkoxy substituted radicals, e.g., methoxy ethyl; carboxy substituted radicals, e.g., carboxy methyl; and cyano substituted radicals, e.g., alpha-cyano alpha-methylethyl. A typical example of a cycloaliphatic radical is cyclohexyl. Thiourea accelerators having the above general formula include N-phenyl-N'-cyclohexylthiourea, N-phenyl-N'-alpha-phenylethylthiourea, N-phenyl-N'-tertiary butylthiourea, N-phenyl-N'-n-butylthiourea, N-phenyl-N'-ethylthiourea, N-para-methoxyphenyl-N'-ethylthiourea, N-para-chlorophenyl-N'-ethylthiourea, N-phenyl-N'-methylthiourea, N-phenyl-N'-isopropylthiourea, N-phenyl-N'-beta-hydroxyethylthiourea, N-phenyl-N'-alpha-methylpropylthiourea, and N-phenyl-N'-beta-methylpropylthiourea.

The thiourea accelerators may be prepared by classical methods one of which is the reaction of a primary amine with phenyl isothiocyanate, a standard preparatory method used for characterizing amines. This reaction may be represented by the following equation:

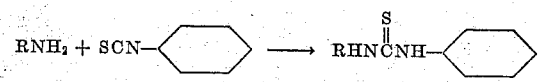

where R is $R_2$ as defined above. A specific illustration of this process is as follows:

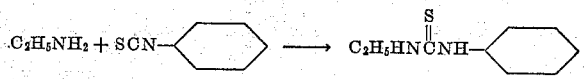

Further details concerning this classical preparatory method as well as other applicable ones may be readily obtained by reference to the article titled "Thioureas" appearing in Chemical Reviews, volume 55, pages 181–228 (1955), by Dorothy C. Schroeder.

The amount of the thiourea accelerator which is incorporated in the chloroprene polymer stock may vary within rather broad limits. In general, from about 0.05% to about 5.0% of the thiourea accelerator based on the weight of the chloroprene polymer is employed. It is preferred to use from about 0.5% to about 1.0% of the thiourea accelerator based on the weight of the chloroprene polymer present in the stock to be vulcanized.

The thiourea accelerators may be used in conjunction with conventional compounding ingredients used in the preparation of polychloroprene vulcanizates. Typical examples of such ingredients include antioxidants, metallic oxides, colors, softeners, fillers, and the like.

The invention will be further illustrated by the data pertaining to Table I below.

A typical polychloroprene, namely neoprene type W, was compounded by milling together the ingredients in the following base formula:

| Components: | Parts by weight |
|---|---|
| Neoprene type W | 100 |
| Stearic acid | 0.5 |
| Zinc oxide | 5 |
| Extra light calcined magnesium oxide | 2 |
| Agerite stalite | 2 |
| P-33 black | 75 |
| Accelerator | 0.5 |

In this formulation agerite stalite is a proprietary antioxidant composition composed of octylated diphenylamines and P-33 black is a proprietary composition of fine thermal carbon black. The polychloroprene stock was vulcanized by air curing at 307° F. for varying lengths of time as set forth in Table I. The physical properties of the various vulcanizates, such as stress, tensile strength, elongation, and hardness were measured as well as the Mooney scorch values. The thiourea accelerators of the invention were compared with the best previously known accelerators, namely thiocarbanilide and ethylenethiourea. In Table I the accelerators of the invention designated as numbers 1 through 12 were respectively (1) N-phenyl-N'-cyclohexylthiourea, (2) N-phenyl-N'-alpha-phenylethylthiourea, (3) N-phenyl-N'-tertiary butylthiourea, (4) N-phenyl-N'-n-butylthiourea, (5) N-phenyl-N'-ethylthiourea, (6) N-para-methoxyphenyl-N'-ethylthiourea, (7) N-para-chlorophenyl-N'-ethylthiourea, (8) N-phenyl-N'-methylthiourea, (9) N-phenyl-N'-isopropylthiourea, (10) N-phenyl-N'-beta-hydroxyethylthiourea, (11) N-phenyl-N'-alpha-methylpropylthiourea, and (12) N-phenyl-N'-beta-methylpropylthiourea.

From a study of the data in Table I above it may be readily seen that all of the thiourea accelerators cure a chloroprene polymer such as neoprene type W. The thiourea accelerators of the invention impart to the vulcanizates comparable or better physical properties than are imparted thereto by thiocarbanilide. The novel thiourea accelerators cure to a higher state as measured by hardness than does thiocarbanilide. In addition, the thiourea accelerators of the invention impart to the vulcanizates physical properties comparable to those imparted thereto by ethylenethiourea and, more important are not nearly as scorchy as is ethylenethiourea as shown by the higher Mooney scorch values.

While all the accelerators of the invention are of particular interest in the vulcanization of the chloroprene polymer known as neoprene type W, it will be appreciated that they are useful in the vulcanization of other chloroprene polymers. Moreover, other thiourea accelerators falling under the general formula given above may be employed with comparable results.

Various modifications and changes may be made in the invention herein set forth without departing from the spirit thereof and accordingly the invention is to be limited only within the scope of the appended claims.

We claim:

1. A vulcanizable polychloroprene composition comprising an unvulcanized chloroprene polymer and from about 0.05% to about 5.0% of the weight of the polymer of a thiourea compound capable of acting by itself as a vulcanization accelerator for the polymer and having the general formula

$$R_1HNCNHR_2 \quad (\text{with } S \text{ double-bonded to } C)$$

where $R_1$ is a monocyclic aryl radical and $R_2$ is a radical selected from the group consisting of saturated aliphatic radicals having from one to eight carbon atoms and cycloaliphatic radicals having from three to six carbon atoms.

2. A vulcanizable polychloroprene composition comprising an unvulcanized chloroprene polymer and from about 0.5% to about 1.0% of the weight of the polymer of a thiourea compound capable of acting by itself as a Table I

| Accelerator | 1 | 2 | 3 | 4 | 5 | 6 | 7 | 8 | 9 | 10 | 11 | 12 | Thiocarbanilide | Ethylenethiourea |
|---|---|---|---|---|---|---|---|---|---|---|---|---|---|---|
| *Mooney Scorch at 250° F. (5 point rise)* | | | | | | | | | | | | | | |
|  | 11 | 11 | 11 | 13 | 13 | 14 | 14 | 11 | 11 | 7 | 13 | 15 | 13 | 6 |
| *Stress in P.s.i. at 300% Elongation* | | | | | | | | | | | | | | |
| Air Cure in minutes at 307° F.: | | | | | | | | | | | | | | |
| 10 | 890 | 880 | 580 | 1,170 | 1,060 | 1,160 | 1,080 | 1,270 | 1,220 | 1,110 | 1,130 | 1,270 | 1,100 | 1,390 |
| 20 | 1,090 | 1,110 | 870 | 1,320 | 1,330 | 1,360 | 1,330 | 1,400 | 1,430 | 1,240 | 1,330 | 1,430 | 1,140 | 1,665 |
| 30 | 1,110 | 1,210 | 1,000 | 1,360 | 1,400 | 1,400 | 1,380 | 1,400 | 1,550 | 1,500 | 1,330 | 1,400 | 1,500 | 1,220 | 1,770 |
| 45 | 1,260 | 1,210 | 1,090 | 1,310 | 1,430 | 1,430 | 1,420 | 1,410 | 1,550 | 1,530 | 1,380 | 1,430 | 1,550 | 1,270 | 1,865 |
| *Tensile Strength in P.s.i.* | | | | | | | | | | | | | | |
| 10 | 2,240 | 2,290 | 1,990 | 2,270 | 2,270 | 2,190 | 2,280 | 2,190 | 2,300 | 2,190 | 2,280 | 2,170 | 2,310 | 2,200 |
| 20 | 2,400 | 2,440 | 2,340 | 2,390 | 2,410 | 2,320 | 2,370 | 2,280 | 2,420 | 2,240 | 2,390 | 2,260 | 2,310 | 2,355 |
| 30 | 2,440 | 2,460 | 2,450 | 2,390 | 2,430 | 2,340 | 2,380 | 2,280 | 2,420 | 2,280 | 2,410 | 2,300 | 2,380 | 2,425 |
| 45 | 2,520 | 2,490 | 2,540 | 2,400 | 2,460 | 2,320 | 2,390 | 2,380 | 2,420 | 2,360 | 2,440 | 2,330 | 2,380 | 2,475 |
| *Percent Elongation at Break* | | | | | | | | | | | | | | |
| 10 | 670 | 680 | 780 | 560 | 540 | 540 | 560 | 510 | 520 | 560 | 550 | 510 | 590 | 525 |
| 20 | 620 | 580 | 680 | 530 | 500 | 480 | 500 | 470 | 480 | 510 | 480 | 460 | 560 | 455 |
| 30 | 580 | 580 | 650 | 530 | 490 | 480 | 480 | 440 | 470 | 510 | 470 | 460 | 560 | 435 |
| 45 | 570 | 570 | 650 | 520 | 480 | 460 | 460 | 440 | 460 | 480 | 470 | 450 | 530 | 420 |
| *Shore Hardness No.* | | | | | | | | | | | | | | |
| 10 | 54 | 54 | 50 | 58 | 59 | 55 | 55 | 57 | 56 | 55 | 55 | 57 | 50 | 61 |
| 20 | 55 | 56 | 53 | 60 | 60 | 57 | 55 | 58 | 56 | 57 | 57 | 59 | 52 | 62 |
| 30 | 57 | 57 | 55 | 60 | 61 | 57 | 56 | 59 | 57 | 57 | 57 | 60 | 53 | 63 |
| 45 | 58 | 57 | 55 | 60 | 61 | 58 | 56 | 60 | 57 | 57 | 57 | 60 | 55 | 64 | vulcanization accelerator for the polymer and having the general formula

wherein $R_1$ is a monocyclic aryl radical and $R_2$ is a radical selected from the group consisting of saturated aliphatic radicals having from one to eight carbon atoms and cycloaliphatic radicals having from three to six carbon atoms.

3. A composition as set forth in claim 2 wherein the thiourea compound is N-phenyl-N'-cyclohexylthiourea.

4. A composition as set forth in claim 2 wherein the thiourea compound is N-phenyl-N'-alpha-phenylethyl-thiourea.

5. A composition as set forth in claim 2 wherein the thiourea compound is N-phenyl-N'-ethylthiourea.

6. A composition as set forth in claim 2 wherein the thiourea compound is N-para-methoxyphenyl-N'-ethyl-thiourea.

7. A vulcanizable polychloroprene composition comprising sulfur free polychloroprene and from about 0.05% to about 5.0% of the weight of the polymer of a thiourea compound capable of acting by itself as a vulcanization accelerator for the polymer and having the general formula

where $R_1$ is a monocyclic aryl radical and $R_2$ is a radical selected from the group consisting of saturated aliphatic radicals having from one to eight carbon atoms and cycloaliphatic radicals having from three to six carbon atoms.

8. A vulcanizable polychloroprene composition comprising sulfur free polychloroprene and from about 0.5% to about 1.0% of the weight of the polymer of a thiourea compound capable of acting by itself as a vulcanization accelerator for the polymer and having the general formula

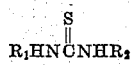

where $R_1$ is a monocyclic aryl radical and $R_2$ is a radical selected from the group consisting of saturated aliphatic radicals having from one to eight carbon atoms and cycloaliphatic radicals having from three to six carbon atoms.

9. A composition as set forth in claim 8 wherein the thiourea compound is N-phenyl-N'-cyclohexylthiourea.

10. A composition as set forth in claim 8 wherein the thiourea compound is N-phenyl-N'-alpha-phenylethyl-thiourea.

11. A composition as set forth in claim 8 wherein the thiourea compound is N-phenyl-N'-ethylthiourea.

12. A composition as set forth in claim 8 wherein the thiourea compound is N-para-methoxyphenyl-N'-ethyl-thiourea.

13. The process of vulcanizing chloroprene polymers comprising incorporating in a chloroprene polymer stock from about 0.05% to about 5.0% of the weight of the polymer of a thiourea compound capable of acting by itself as a vulcanization accelerator for the polymer and having the general formula

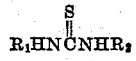

where $R_1$ is a monocyclic aryl radical and $R_2$ is a radical selected from the group consisting of saturated aliphatic radicals having from one to eight carbon atoms and cycloaliphatic radicals having from three to six carbon atoms, and heating at vulcanizing temperatures to cure the polymer.

14. The process of vulcanizing chloroprene polymers comprising incorporating in a chloroprene polymer stock from about 0.5% to about 1.0% of the weight of the polymer of a thiourea compound capable of acting by itself as a vulcanization accelerator for the polymer and having the general formula

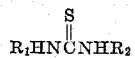

where $R_1$ is a monocyclic aryl radical and $R_2$ is a radical selected from the group consisting of saturated aliphatic radicals having from one to eight carbon atoms and cycloaliphatic radicals having from three to six carbon atoms, and heating at vulcanizing temperatures to cure the polymer.

15. The process as set forth in claim 14 wherein the thiourea compound is N-phenyl-N'-cyclohexylthiourea.

16. The process as set forth in claim 14 wherein the thiourea compound is N-phenyl-N'-alpha-phenylethyl-thiourea.

17. The process as set forth in claim 14 wherein the thiourea compound is N-phenyl-N'-ethylthiourea.

18. The process as set forth in claim 14 wherein the thiourea compound is N-para-methoxyphenyl-N'-ethyl-thiourea.

19. The process of vulcanizing chloroprene polymers comprising incorporating in sulfur free polychloroprene stock from about 0.05% to about 5.0% of the weight of the polymer of a thiourea compound capable of acting by itself as a vulcanization accelerator for the polymer and having the general formula

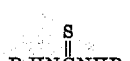

where $R_1$ is a monocyclic aryl radical and $R_2$ is a radical selected from the group consisting of saturated aliphatic radicals having from one to eight carbon atoms and cycloaliphatic radicals having from three to six carbon atoms, and heating at vulcanizing temperatures to cure the polymer.

20. The process of vulcanizing chloroprene polymers comprising incorporating in sulfur free polychloroprene stock from about 0.5% to about 1.0% of the weight of the polymer of a thiourea compound capable of acting by itself as a vulcanization accelerator for the polymer and having the general formula

where $R_1$ is a monocyclic aryl radical and $R_2$ is a radical selected from the group consisting of saturated aliphatic radicals having from one to eight carbon atoms and cycloaliphatic radicals having from three to six carbon atoms, and heating at vulcanizing temperatures to cure the polymer.

21. The process as set forth in claim 20 wherein the thiourea compound is N-phenyl-N'-cyclohexylthiourea.

22. The process as set forth in claim 20 wherein the thiourea compound is N-phenyl-N'-alpha-phenyl-ethyl-thiourea.

23. The process as set forth in claim 20 wherein the thiourea compound is N-phenyl-N'-ethylthiourea.

24. The process as set forth in claim 20 wherein the thiourea compound is N-para-methoxyphenyl-N'-ethyl-thiourea.

References Cited in the file of this patent

UNITED STATES PATENTS

| | | |
|---|---|---|
| 2,071,966 | Bolton | Feb. 23, 1937 |
| 2,397,399 | Baird | Mar. 26, 1946 |
| 2,544,746 | Baum | Mar. 13, 1951 |
| 2,804,447 | Naylor | Aug. 27, 1957 |

OTHER REFERENCES

Dehn: J. Am. Chem. Soc., 62, 3189, 3190 (November 1940).